United States Patent
Ghosh et al.

(10) Patent No.: US 11,635,774 B2
(45) Date of Patent: Apr. 25, 2023

(54) DYNAMIC ANCHOR SELECTION FOR SWARM LOCALIZATION

(71) Applicant: Intel Corporation, Santa Clara, CA (US)

(72) Inventors: Dibyendu Ghosh, Bangalore (IN); Ganeshram Nandakumar, Chennai (IN); Karthik Narayanan, Chengannur (IN); Vinayak Honkote, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 16/457,925

(22) Filed: Jun. 29, 2019

(65) Prior Publication Data

US 2019/0324479 A1  Oct. 24, 2019

(51) Int. Cl.
  *G05D 1/10* (2006.01)
  *B64C 39/02* (2006.01)
  *G05D 1/00* (2006.01)
  *G01C 21/12* (2006.01)

(52) U.S. Cl.
  CPC .......... *G05D 1/104* (2013.01); *B64C 39/024* (2013.01); *G01C 21/12* (2013.01); *G05D 1/0088* (2013.01); *B64C 2201/126* (2013.01); *B64C 2201/141* (2013.01)

(58) Field of Classification Search
  CPC .... G05D 1/104; G05D 1/0208; G05D 1/0295; G05D 1/0027; G05D 1/0816; G05D 1/0088; G05D 1/101; G05D 1/1064; G05B 2219/39146; G01C 21/12; B64C 39/024; B64C 2201/143; B64C 2201/141
  See application file for complete search history.

(56) References Cited

U.S. PATENT DOCUMENTS

| | | | | |
|---|---|---|---|---|
| 9,606,535 | B2* | 3/2017 | Humenay | H04W 4/02 |
| 9,810,789 | B2* | 11/2017 | Levien | G01S 19/21 |
| 10,845,457 | B2* | 11/2020 | Fowe | G01S 5/0072 |
| 2016/0114487 | A1* | 4/2016 | Lacaze | B64C 39/024 |
| | | | | 901/1 |

(Continued)

OTHER PUBLICATIONS

Gunantara, Nyoman, "A Review of Multi-Objective Optimization: Methods and its Applications," Cogent Engineering, 5:1502242, (2018), date published Jul. 25, 2018 (16 pages).

(Continued)

*Primary Examiner* — Christian Chace
*Assistant Examiner* — Shayne M. Gilbertson
(74) *Attorney, Agent, or Firm* — Alliance IP, LLC (57) ABSTRACT

An apparatus comprises at least one sensor to collect localization information indicating a location of a first robotic agent of a plurality of robotic agents; and a processor comprising circuitry. The processor is to cause the first robotic agent to move and to utilize the at least one sensor and other robotic agents of the plurality of robotic agents to determine the location of the first robotic agent during a first period of time in which the first robotic agent is not selected as an anchor reference point; and cause the first robotic agent to remain stationary during a second period of time in which the first robotic agent is selected as an anchor reference point to assist other robotic agents of the plurality of robotic agents in location determination.

22 Claims, 7 Drawing Sheets

(56) References Cited

U.S. PATENT DOCUMENTS

| | | | | |
|---|---|---|---|---|
| 2017/0068243 | A1* | 3/2017 | MacCready | G05D 1/104 |
| 2018/0074520 | A1* | 3/2018 | Liu | G08G 5/0052 |
| 2018/0373240 | A1* | 12/2018 | Kim | G05D 1/104 |
| 2019/0069380 | A1* | 2/2019 | Kastee | G05B 15/02 |
| 2019/0258276 | A1* | 8/2019 | Lacaze | B64C 39/024 |
| 2019/0285730 | A1* | 9/2019 | Beer | G01S 7/411 |
| 2019/0351542 | A1* | 11/2019 | Buerger | B25J 9/1664 |
| 2019/0369613 | A1* | 12/2019 | Moon | B64C 39/024 |

OTHER PUBLICATIONS

Halsted, Trevor et al., "Distributed Multi-Robot Localization from Acoustic Pulses Using Euclidean Distance Geometry," 2017 International Symposium on Multi-Robot and Multi-Agent Systems (MRS), University of Southern California, LA, USA, Dec. 4-5, 2017 (8 pages).

Jiang, We, et al., "Sensing Attribute Weights: A Novel Basic Belief Assignment Method," Sensors 2017, 17, 721, doi: 10.3390/s17040721, MDPI, School of Electronics and Information, Northwestern Polytechnical University, Xi/an 710072, China, Published Mar. 30, 2017 (20 pages).

Rashid, Abdulmuttalib T. et al., "Multi-Robot Localization and Orientation Estimation Using Robotic Cluster Matching Algorithm," Robotics and Autonomous Systems, 63 (2015) 108-121, Publication Date Sep. 16, 2014 (108 pages).

\* cited by examiner

| $A_X$ | $L_{A_X}$ | $Spacial_{A_X}$ | $H_{A_X}$ | $critical\_task_{A_X}$ | $E_{A_X}$ | $C_{A_X}$ | $N_{A_X}$ | $O_{A_X}$ |

$Winner\_list_{A_1} = Optimise\_function(A_1, L_{A_1}, Spacial_{A_1}, H_{A_1}, critical\_task_{A_1}, E_{A_1}, C_{A_1}, N_{A_1}, O_{A_1})$ to $Winner\_list_{A_l} = Optimise\_function(A_l, L_{A_l}, Spacial_{A_l}, H_{A_l}, critical\_task_{A_l}, E_{A_l}, C_{A_l}, N_{A_l}, O_{A_l})$ $Winner\_list_{final} = Merge(Winner\_list_{A_1}, ..., Winner\_list_{A_l})$

FIG. 7

DYNAMIC ANCHOR SELECTION FOR SWARM LOCALIZATION

TECHNICAL FIELD

This disclosure relates in general to the field of computing systems and, more particularly, to computing systems facilitating dynamic anchor selection for swarm localization.

BACKGROUND

Use of robotic agents to perform tasks has significantly increased in a number of fields such as search, surveillance, and patrolling while showing no signs of slowing down in the foreseeable future. As technology advances, a transition is occurring from robotic agents working individually to perform tasks to swarms of robotic agents actively coordinating to accomplish a common goal. Such an interaction requires much higher levels of perception of not just the environment, but also the robotic agents around them. In a dynamic set of robotic agents working together, the positions of each of the individual robotic agents with respect to each other and with respect to global coordinates may be used to enable coordination of the robotic agents.

BRIEF DESCRIPTION OF THE DRAWINGS

Like reference numbers and designations in the various drawings indicate like elements.

DESCRIPTION OF EXAMPLE EMBODIMENTS

Figure 1A:
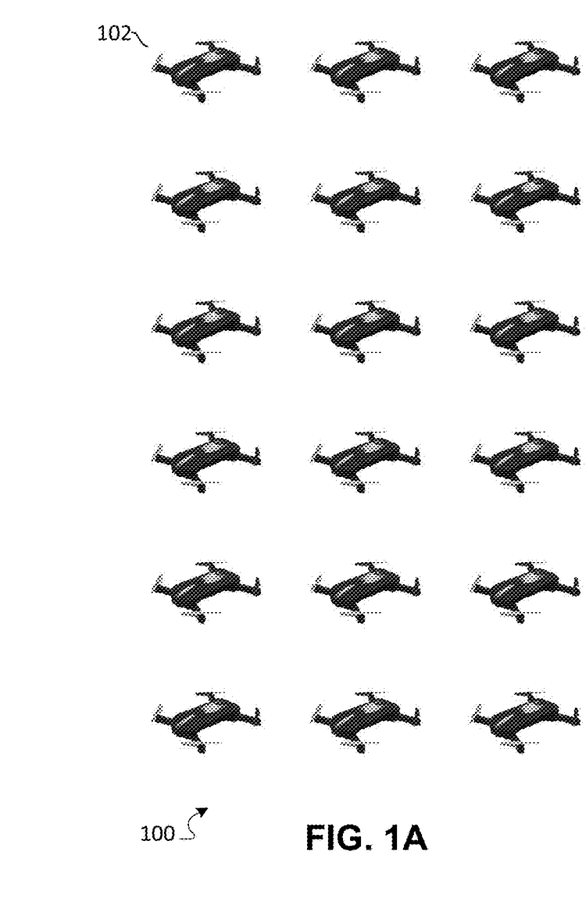
FIGS. 1A and 1B depict a system to facilitate dynamic anchor selection for swarm localization and an example robotic agent in accordance with certain embodiments.
Figure 1B:
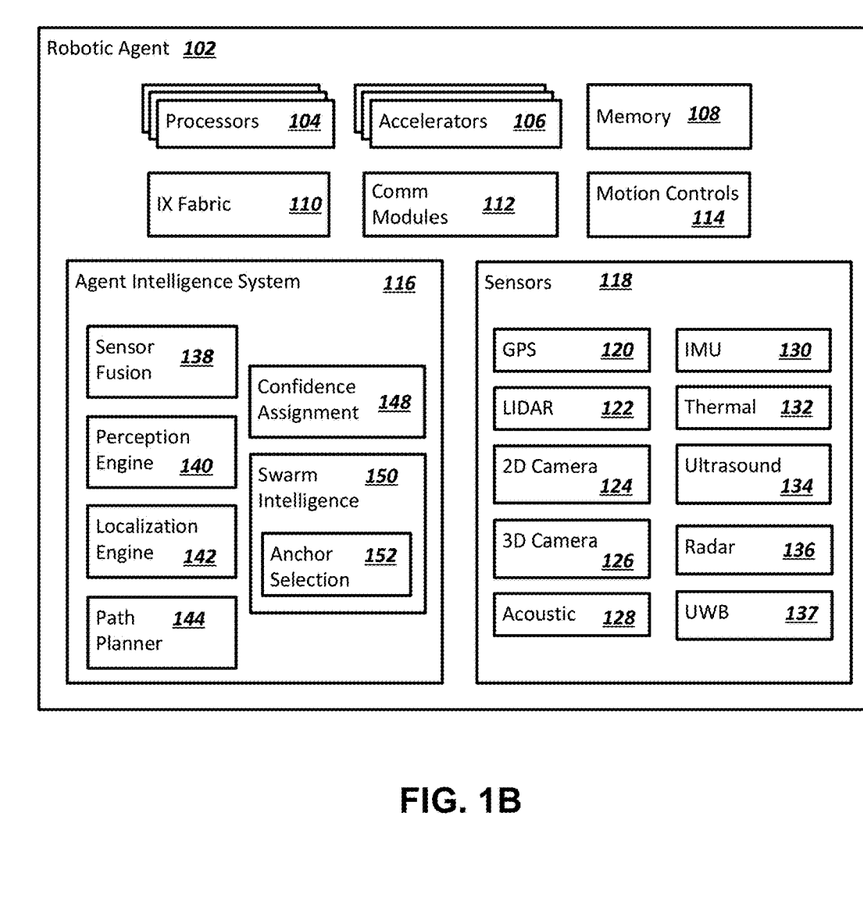

FIG. 1A depicts a system 100 to facilitate dynamic anchor selection for swarm localization in accordance with certain embodiments. System 100 includes a plurality of robotic agents 102 arranged in a group, also referred to herein as a swarm. FIG. 1B depicts an example robotic agent 102. The robotic agents 102 may work together to perform a mission. During performance of this mission, the robotic agents may change positions over time. Accurate position tracking by the robotic agents may be vital to effective performance of the mission.

A robotic agent 102 may determine any suitable position information. For example, a robotic agent 102 may determine an absolute position of the robotic agent 102 with respect to an area of interest (which may be common to the swarm of robotic agents 102) or a global coordinate. As another example, robotic agent 102 may determine a relative position indicating the position of the robotic agent 102 with respect to one or more other robotic agents 102 of the swarm.

A robotic agent 102 may use any suitable method to determine an absolute position. For example, a robotic agent 102 may utilize a Global Positioning System (GPS), one or more fixed anchors (e.g., reference nodes) in conjunction with visual odometry or communication techniques (e.g., triangulation or other distance sensing communications), or iterative techniques such as estimation using inertial measurements, odometry information (e.g., wheel movement), or other dynamics of the robotic agent 102. However, some of these techniques may suffer from various drawbacks. For example, GPS may not be available in some environments (such as indoor environments); static anchor systems may be rigid, inefficient, and are generally unfeasible in many applications which involve exploration and quick deployment; and iterative techniques may be susceptible to drift errors, which may be particularly significant in longer runtimes.

Figure 2A:
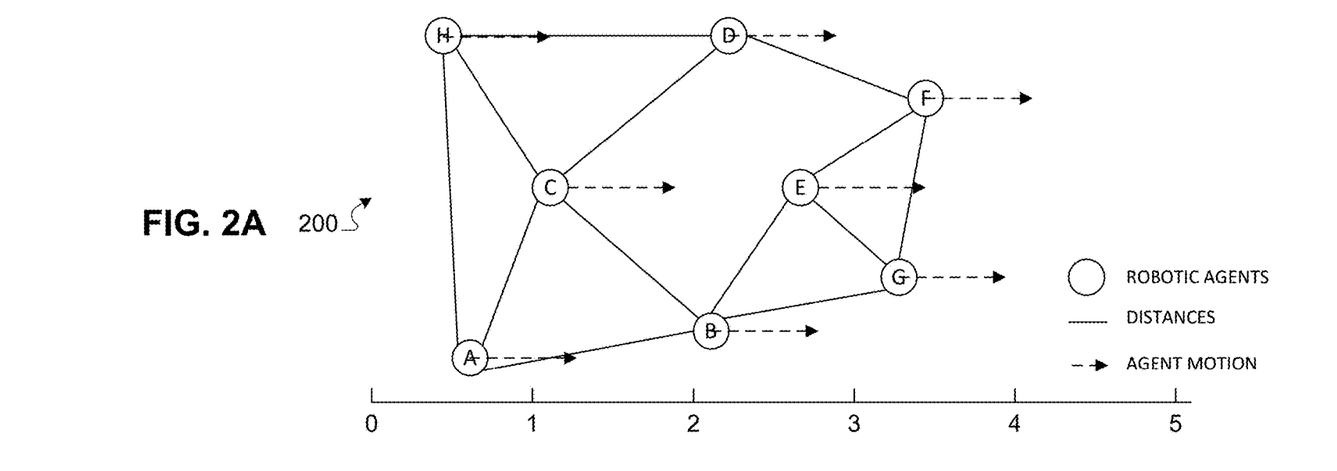
FIGS. 2A-2B depict robotic agent motion and position uncertainty in accordance with certain embodiments.
Figure 2B:
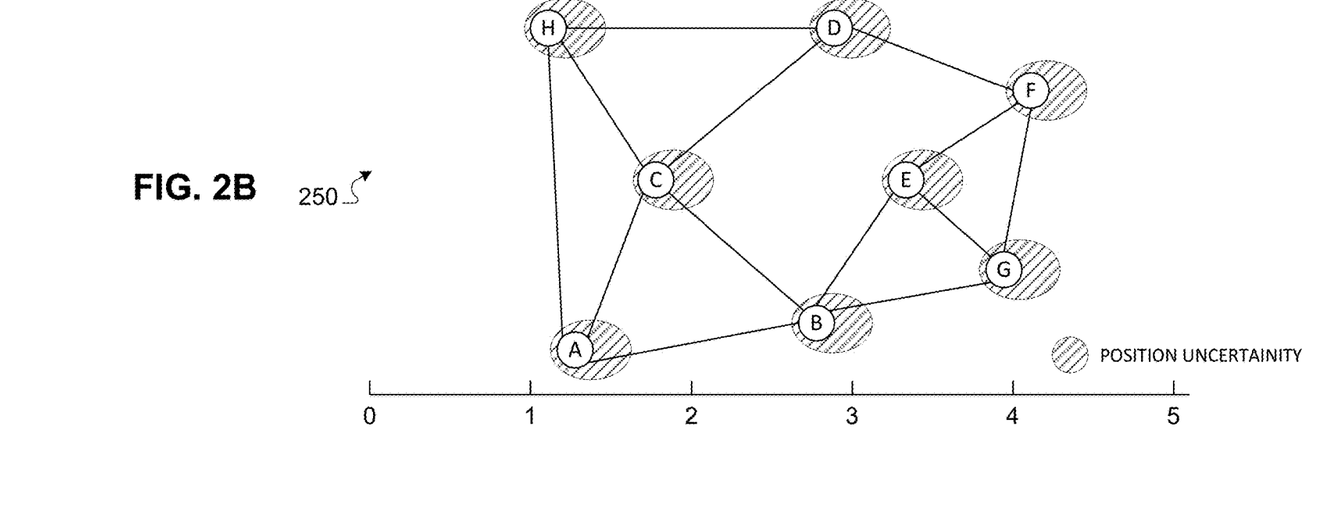

FIG. 2 depicts robotic agent motion and position uncertainty in accordance with certain embodiments. In a deployment scenario in which GPS is not available or is unreliable (e.g., an indoor environment) and static anchors (fixed reference points) are impractical, the robotic agents may rely on the vehicle dynamics, sensor inputs (e.g., inertial measurement unit (IMU)), and odometry (e.g., visual/wheel) to perform position estimation. However, methods involving iterative estimation (e.g., extended Kalman filter) are susceptible to uncertainties in positioning which can grow over time and can reduce the effectiveness of the system or halt its operation altogether.

FIG. 2A depicts a graphical representation 200 of robotic agent motion. In this example, eight robotic agents A-H are working together to navigate through a region. To simplify the scenario, the agents are each shown as moving in the same direction with the same velocity, although the embodiments herein are not limited to such. In a swarm in which the robots are ranging collaboratively, the localization error for an agent (the difference between the actual position of an agent and the position estimated by the agent) is going to build up over time as all the agents are in motion. Graphical representation 250 of FIG. 2B depicts the positional uncertainty of the robotic agents. The actual positions of the robotic agents may be anywhere within the position uncertainty regions depicted.

In various embodiments, the localization error may be improved if a subset of the robotic agents are stationary during a period of time and act as brachiating anchors for the other robotic agents to range with (e.g., the stationary anchors may facilitate location estimation for the non-stationary robotic agents). This concept is inspired from the manner in which primates achieve locomotion (brachiating motion). A first primate makes a firm grip with a second primate before swinging to reach the next grip of a third primate. The hand of the primate is an analogy for each of the robotic agents in the swarm. A firm grip is an analogy for a stationary anchor. The entire swarm depends on these anchors for locomotion. Based on the requirement, another grip/anchor-selection is made by the swarm and the previous grip is released. A primate is expected to maintain at least one firm grip at any instant of time while the other hand is free to perform other actions. In a swarm with many agents, the corollary is that a small subset of agents hold their positions while the other agents are free to carry out the target mission.

For such a system to be effective, the anchor agents may be selected intelligently based on a set of selection metrics (e.g., one or more of localization estimation confidence, relative location within the swarm, agent capability, operational history, connectivity, and network congestion) with respect to the other agents. Thus, as an analogy to the capability of the primate to intelligently select the optimal grips required to perform the task, various embodiments herein utilize a technique to minimize location estimation errors in a swarm of agents using intelligent selection and management of a dynamic set of agents as anchors so as to establish a frame of reference while estimating the positions of the other agents.

Figure 3:
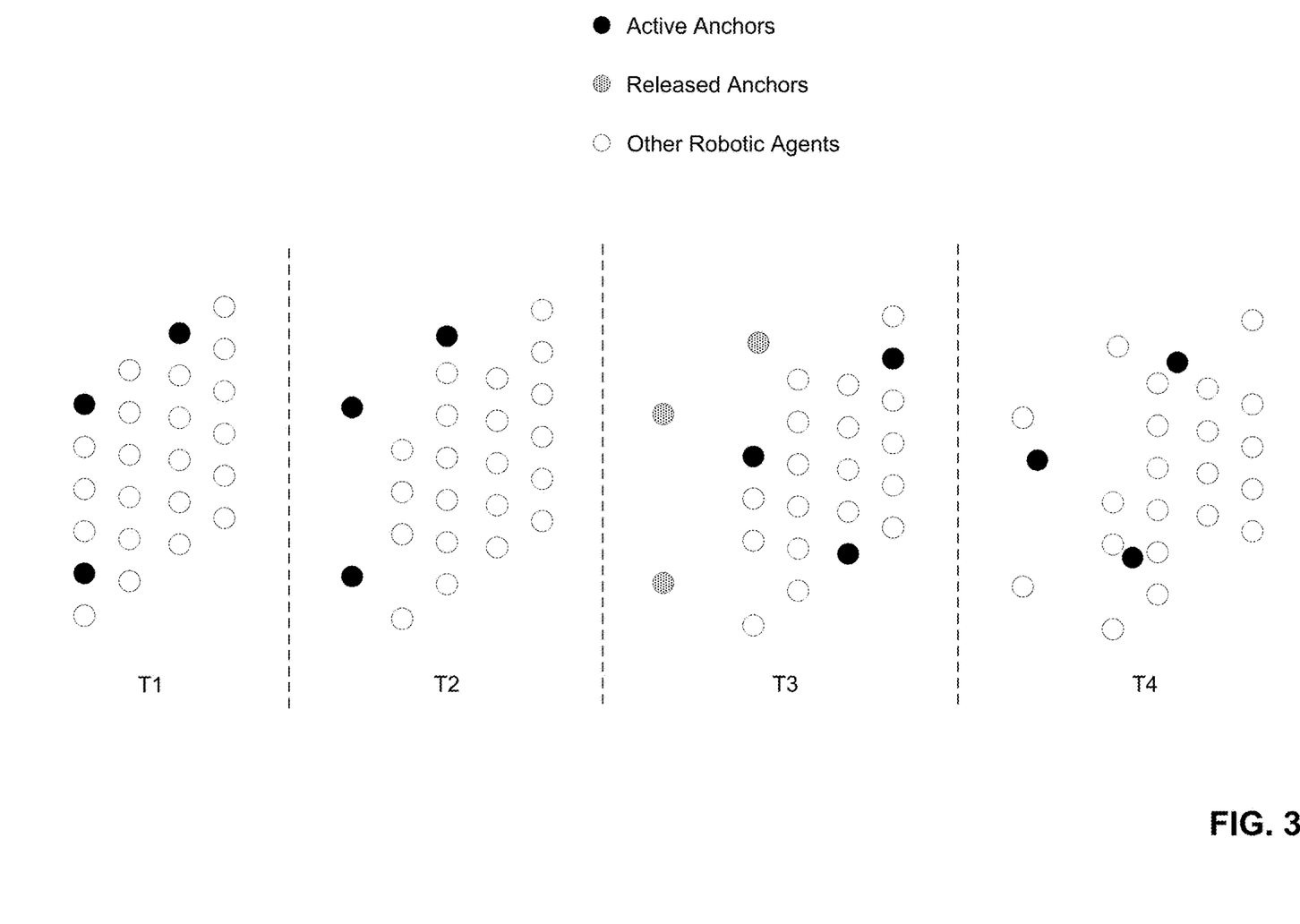
FIG. 3 depicts dynamic anchor selection over time for a swarm of robotic agents in accordance with certain embodiments.

FIG. 3 depicts dynamic anchor selection over time for a swarm of robotic agents 102 in accordance with certain embodiments. In some embodiments, an anchor may be a robotic agent with relatively high locational confidence that acts as a reference point for the localization of the other agents in the system. A set of agents from the swarm may be selected to serve as anchors and hold their position for a period of time. In the example depicted, three agents are selected to serve as anchors at time 1 (T1). These agents remain stationary as the other agents move during the period of time between T1 and T2. In the embodiment depicted, the agents are shown as moving to the right at the same velocity, although the velocities or directions of movement by the agents may differ from agent to agent in other implementations.

A robotic agent that serves as an anchor may facilitate location prediction by the other robotic agents. When swarm begins its mission (e.g., at T1 in the example depicted), the global position of the anchors may be known. A robotic agent that is not serving as an anchor may determine its position relative to the positions of the anchors (or a subset thereof) and may translate this relative position into a global position based on the global positions of the anchors used (which may, e.g., be communicated to the robotic agent from the anchor agents). Thus, at T2, each robotic agent may be aware of its global position because of the known global positions of the anchors and the relative position of the non-anchor agent.

Any suitable relative positioning techniques may be used to determine the relative positions of the non-anchor agents. For example, range based localization may utilize distances between a non-anchor agent and a plurality of anchor agents (e.g., via visual odometry or through communications with time stamps between the non-anchor agents and the anchor agents) to determine the relative position. In some embodiments, a robotic agent may be capable of determining a relative position using a variety of techniques each utilizing a different set of sensor data and may select the technique that is most likely to result in the most accurate position determination (e.g., based on the quality of the sensor data used by the technique).

Since a robotic agent that is not serving as an anchor may calculate its absolute position based on the absolute position of one or more anchors and the relative position of the robotic agent with respect to one or more of the anchors, it may be desirable to select robotic agents having high localization confidence metrics (e.g., low margins of error) as the anchors. Other metrics may also affect which robotic agents are selected as anchors as will be discussed hereafter.

As depicted in FIG. 3, between T2 and T3, the other agents continue to move and a selection process for new anchors takes place. At T3, the active anchors are released and a different set of robotic agents begin service as anchors. When an anchor is released it will resume its mission. In some embodiments, the released anchor agents are not allowed to resume movement until the newly selected agents come to a complete stop. Between T3 and T4, the other robotic agents (including the recently released anchors) move while the anchors remain stationary.

Various embodiments of the present disclosure may provide one or more of the following potential technical advantages: localization errors may be reduced, even after prolonged run times; use of brachiating motion may prevent accumulation over time of error in the position estimation; the robotic agents may be used in a dead reckoning localization system (in a dead reckoning localization system a position is estimated by using an earlier known value and adding whatever changes have occurred since the known value was established); static anchors (e.g., fixed references for localization) are not required, though may be used if desired; selection of the anchors may be distributed among the robotic agents of the swarm to cater to the distributed nature of the information in a swarm; the localization system may provide a robust scheme for operation in unknown/unstructured/hazardous environments; the role of the anchors may be time multiplexed between a portion or all the robotic agents in the system; the system may have similar performance in both indoor and outdoor scenarios; the system may be easily deployed as it is not restricted by the limitations of fixed anchor deployment; the system may be easily scalable from a small swarm of agents to larger swarm with hundreds of agents.

Referring again to FIG. 1, a robotic agent 102 may comprise a computing system. In general, a "computing system" can include one or more electronic computing devices operable to receive, transmit, process, store, or manage data and information. In some embodiments, a computing system may be adapted to execute any operating system, including Linux®, UNIX®, Microsoft Windows®, Apple® OS, Apple® iOS®, Google Android™, Windows Server®, etc., as well as virtual machines adapted to virtualize execution of a particular operating system, including customized and proprietary operating systems.

In one example, a robotic agent 102 may be equipped with one or more processors 104, such as central processing units (CPUs), graphical processing units (GPUs), application specific integrated circuits (ASICs), field programmable gate arrays (FPGAs), digital signal processors (DSPs), tensor processors or other matrix arithmetic processors, among other examples.

Such processors 104 may be coupled to or have integrated hardware accelerator devices (e.g., 106), which may be provided with hardware to accelerate certain processing and memory access functions, such as functions relating to machine learning inference or training, processing of particular sensor data (e.g., camera image data, LIDAR point clouds, etc.), performing certain arithmetic functions pertaining to autonomous movement (e.g., matrix arithmetic, convolutional arithmetic, etc.), among other examples.

One or more memory elements (e.g., 108) may be provided to store machine-executable instructions implementing all or a portion of any one of the engines or modules implemented by the robotic agent 102, as well as storing sensor data and other data received, generated, or used by the robot agent (e.g., mission specific data or data collected by sensors 118).

The various components of the robotic agent (e.g., processors 104, accelerators 106, memory devices 108, and network communication modules 112), may be interconnected through one or more interconnect fabrics or links (e.g., 110), such as fabrics utilizing technologies such as a Peripheral Component Interconnect Express (PCIe), Ethernet, OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

Various communication modules (e.g., 112) may also be provided (e.g., implemented in hardware circuitry and/or software) to provide communication capabilities used by the robotic agent to communicate with other robotic agents or other computing systems over one or more network channels employing one or more network communication technologies.

In some implementations, robotic agents (e.g., 102) within the environment may be "connected" in that the computing systems of the robotic agents include communication modules to support wireless communication using one or more technologies (e.g., Institute of Electrical and Electronics Engineers (IEEE) 802.11 communications (e.g., WiFi), cellular data networks (e.g., 3rd Generation Partnership Project (3GPP) networks, Global System for Mobile Communication (GSM), general packet radio service, code division multiple access (CDMA), etc.), Bluetooth, millimeter wave (mmWave), ZigBee, Z-Wave, etc.), allowing the computing systems of the robotic agents to connect to and communicate with other computing systems. Robotic agents may communicate with other connected robotic agents over wireless communication channels to share data (e.g., location and anchor selection information) and coordinate movement, among other example communications.

Robotic agent 102 may also include motion controls 114 to enable and control movement of the robotic agent 102 through the air, on the ground, through water, or through another medium depending on the application. Any motion controls 114 may be used to control the movement of the vehicle, such as steering or flight controls, accelerator/throttle controls, and braking controls, among other examples.

Robotic agent 102 may include any suitable sensors 118 for use in localization, inference, path planning, and other tasks performed by the robotic agent (e.g., mission specific tasks). As an example, a robotic agent 102 may possess an array of sensors 118 to collect various information relating to the exterior of the robotic agent and the surrounding environment, robotic agent system status, conditions within the robotic agent, and other information usable by the engines of the agent intelligence system 116. For instance, such sensors 118 may include any subset of the following: one or more global positioning (GPS) sensors 120, light detection and ranging (LIDAR) sensors 122, two-dimensional (2D) cameras 124, three-dimensional (3D) or stereo cameras 126, acoustic sensors 128, inertial measurement unit (IMU) sensors 130, thermal sensors 132, ultrasound sensors 134, radar sensors 136, ultra-wideband sensors (UWB) 137, and weather sensors (not shown), among other example sensors. Sensor data consumed by the robotic agent 102 may also be generated by sensors that are not integrally coupled to the robotic agent, including sensors on other robotic agents (which may be communicated to the robotic agent 102 through agent-to-agent communications or other techniques) or other sensors present within the environment of the robotic agent.

Agent intelligence system 116 may provide various engines implementing various functionalities of the robotic agent 102. In the embodiment depicted, agent intelligence system 116 includes a sensor fusion engine 138, perception engine 140, localization engine 142, path planner engine 144, confidence assignment engine 148, and swarm intelligence engine 150.

A sensor fusion engine 138 may be used to govern the use and processing of the various sensor inputs utilized by agent intelligence system 116. Sensor fusion engine 138 may derive an output from multiple sensor data sources (e.g., on the robotic agent or extraneous to the robotic agent). The sources may be homogenous or heterogeneous types of sources (e.g., multiple inputs from multiple instances of a common type of sensor, or from instances of multiple different types of sensors). An example sensor fusion engine 138 may apply direct fusion, indirect fusion, among other example sensor fusion techniques. The output of the sensor fusion may, in some cases be fed as an input (along with potentially additional inputs) to another engine of the agent intelligence system 116 and/or one or more machine learning models in connection with providing robotic agent functionality, such as described in the example solutions discussed herein.

A perception engine 140 may be provided in some examples, which may take as inputs various sensor data including data, in some instances, from extraneous sources and/or sensor fusion engine 138 to perform object recognition and/or tracking of detected objects, among other example functions corresponding to autonomous perception of the environment encountered (or to be encountered) by the robotic agent 102. Perception engine 140 may perform object recognition from sensor data inputs using any suitable methods, such as deep learning, e.g., through one or more convolutional neural networks or other machine learning models. Object tracking may also be performed to autonomously estimate, from sensor data inputs, whether an object is moving and, if so, along what trajectory. For instance, after a given object is recognized, a perception engine 140 may detect how the given object moves in relation to the robotic agent. Such functionality may be used, for instance, to detect objects, such as other robotic agents, pedestrians, wildlife, cyclists, etc. moving within an environment, which may affect the path of the robotic agent on a roadway, among other example uses.

Agent intelligence system 116 may also include a localization engine 142. The localization engine 142 may make use of data collected by the sensors 118 and the positions of anchor agents to determine a position of the robotic agent. The localization engine 142 may use any of the techniques described herein to estimate an absolute position or a relative position of the robotic agent. In some embodiments, localization engine 142 may utilize one or more sensor fusion algorithms to determine the position, such as fuzzy sets theory, Dempster-Shafer evidence theory (D-S evidence theory), Z numbers, D numbers, or neural networks.

A robotic agent 102 may further include a path planner engine 144, which may make use of the results of various other engines, such as sensor fusion (e.g., 138), perception engine (e.g., 140), and localization engine (e.g., 142) among others to determine a path plan and/or action plan for the robotic agent, which may be used by motion controls (e.g., 114) to control the movement of the robotic agent 102 within an environment. For instance, a path planner engine 144 may utilize these inputs and one or more machine learning models to determine probabilities of various events within a movement environment to determine effective real-time plans to act within the environment. Within simpler environments, one or more of these engines facilitating autonomous movement may be omitted (e.g., when the robotic agent 102 follows a predetermined route or has a route controlled by an external entity).

The confidence assignment engine 148 utilizes information from sensors 118 and the localization engine 142 to assign a localization confidence metric to a position estimation generated by the localization engine 142. Different sensors follow inherent distributions defining their accuracy. These distributions may be defined at deployment and may be updated in real-time. Many relevant statistical methods can be used to describe the variations of sensor and localization accuracy with time and embodiments may utilize any suitable methods for determining the localization confidence metric. For example, the uncertainties associated with data from one or more sensors may be utilized in conjunction with one or more sensor fusion algorithms (such as those listed above) to determine the localization confidence metric. In some embodiments, the sensors may be weighted differently, such that the uncertainty associated with a particular sensor may have a greater effect on the localization confidence metric than a similar amount of uncertainty associated with a different sensor.

As an example, a robotic agent may comprise "N" sensors (where N is any suitable positive integer) contributing information used during the position determination. Each sensor has different characteristics which can be quantified by a noise model of the respective sensor. The sensor noise model may be defined using "K" statistical parameters (where K is any suitable positive integer), such as mean, variance, or other statistical metric indicative of the quality of data sensed by the sensor. In a particular embodiment, the confidence assignment engine 148 may track the statistical distribution of the sensors in real time using the table provided below or the like.

| Statistical parameters | Sensor$_1$ | Sensor$_2$ | ... | Sensor$_N$ |
|---|---|---|---|---|
| Parameter$_1$ | | | | ... |
| Parameter$_2$ | | | | ... |
| . | | ... | ... | ... |
| . | | | | |
| Parameter$_K$ | | | | ... |
| | $f^{S_1}(...)$ | $f^{S_2}(...)$ | | $f^{S_N}(...)$ |

In the table depicted, $f^{S_1}(..) ... f^{S_N}(..)$ are the statistical distribution models of the sensors Sensor$_1$ to Sensor$_N$ derived from Parameter$_1$ to Parameter$_K$ respectively (e.g., $f^{S_1}(..)$ is derived from the values of Parameter$_1$ to Parameter$_K$ of Sensor$_1$, $f^{S_2}(..)$ is derived from Parameter$_1$ to Parameter$_K$ of Sensor$_2$, and so on). The localization confidence of robotic agent$_1$ may then be defined as $C_{A_1}$=fusion $\{f^{S_1}(..), f^{S_2}(..), ..., f^{S_N}(..)\}$. In general, better signal strength for a particular sensor will result in a higher $f^{S_N}(..)$ score and potentially a higher localization confidence depending on the particular fusion algorithm used and the other scores from the other sensors. In some scenarios, the availability of reliable data from a particular type of sensor (e.g., GPS), may play a particularly dominant role in the localization confidence. In some embodiments, the values for each cell associated with a particular sensor in the above table (or the like) are updated each time a set of incoming sensor information is received. In sum, the localization confidence may be based on any one or more parameters of any one or more sensors that affect the accuracy of the location estimation. As just one example, if a particular agent is using visual odometry for location estimation, but does not have a clear line of sight to one or more of the anchor agents that it is using as a reference point, that agent may have a lower localization confidence than another agent that has a clear line of sight to each anchor agent used for position determination.

Swarm intelligence engine 150 manages inter-agent interactions and aids in accomplishing the mission of the swarm. Of particular note, swarm intelligence engine 150 includes an anchor selection engine 152 (among other logic) to participate in the selection of the robotic agents to serve as anchors.

In various embodiments, any one or more parameters may be considered during selection of the anchors. For example, for the current cycle $A_x$, any one or more of the following parameters may be considered during selection of anchors for the next cycle of operation: current localization confidence ($L_{A_x}$), current locations of the robotic agents with respect to the spatial distribution of the agents in the swarm (Spacial$_{A_x}$), results of previous instances of the selection process ($H_{A_x}$), criticality of the current missions performed by the agents (critical_task$_{A_x}$), environmental conditions ($E_{A_x}$), connectivity among the agents of the swarm ($C_{A_x}$), network congestion (e.g., bandwidth limitations) ($N_{A_x}$), or other parameters ($O_{A_x}$). Each of these is discussed in turn below.

In some embodiments, the parameters listed above may comprise one or more values associated with each robotic agent of the swarm (or a subset thereof) as determined by a particular robotic agent participating in the selection process. As an example, in one embodiment $L_{A_x}=\{C_{A1}, C_{A2}, ... C_{Am}\}$ where m is the number of the particular robotic agent and x is the number of the robotic agent participating in the selection process. Similarly, other parameters listed above may comprise a set of metrics, such as one or more metrics for each agent of the swarm (or a subset thereof).

As described above, a current localization confidence metric ($L_{A_x}$) includes metrics providing an indication of the certainty of the location estimation for one or more robotic agents at a particular point in time (e.g., the current cycle $A_x$). This localization confidence may fluctuate based on the quality of data collected by sensor(s) of the robotic agents (as sensors may perform differently in different environments).

Anchor selection engine 152 may also take into account current locations of robotic agents with respect to the spatial distribution of the agents in the swarm (Spacial$_{A_x}$). A spatially distributed set of agents may enable more accurate location estimation by the agents not selected as anchors. Thus, in some embodiments, the anchor selection engine 152 may indicate a preference for a particular robotic agent that is located on the periphery of the swarm than for a robotic agent located in the middle of the swarm. As another example, if the swarm is moving in a particular direction, the anchor selection engine 152 may disfavor a robotic agent that is positioned at a boundary of the swarm that is opposite to the direction the swarm is traveling (as the distance between that agent and the rest of the swarm may be more than desirable as the swarm moves during the next cycle). The number of neighbors in the vicinity of a robotic agent may also affect the preference for that agent to serve as an anchor (with an increased number of neighbors leading to a higher score assuming that the agent has enough available communication bandwidth to serve these neighbors). Line of sight may also be taken into account based on information in Spacial$_{A_x}$ (e.g., to protect against agents obstructing other agents' access to the anchor agent).

Anchor selection engine 152 may also take into account results of previous instances of the selection process ($H_{A_x}$).

For example, the anchor selection engine 152 may aim to distribute the time served as an anchor (e.g., equally or according to some other distribution) among the robotic agents and thus if a particular robotic agent has served as an anchor longer than other robotic agents, the agent may not be preferred to serve as an anchor during the next cycle. As another example, in some implementations, the anchor selection engine 152 may prevent a robotic agent from serving as an anchor for two cycles in a row.

Anchor selection engine 152 may also take into account a criticality of the current mission performed by an agent (critical_task$_{A_X}$). For example, if a particular agent is performing an especially critical task, the selection engine 152 may be less likely to select such an agent as an anchor relative to an agent performing a less critical task. As another example, the selection engine may take into account that particular agents may be more suited to serve as anchors than others (e.g., they may have sensors that are more suitable to location determination or they may be lightweight agents that do not have components that the other agents have for particular tasks of the mission).

Anchor selection engine 152 may also take into account environmental conditions ($E_{A_X}$) that may affect the ability of an agent to serve as an effective anchor, such as weather or obstructions (e.g., buildings, trees, etc.).

Anchor selection engine 152 may also take into account connectivity among the agents of the swarm ($C_{A_X}$). For a particular agent, this information may include an indication of how many other agents (or which agents) the particular agent is able to communicate with, a measure of one or more signal strengths between the agent and one or more other agents, or other suitable measure of the connectivity of the agent.

Anchor selection engine 152 may also take into account network congestion (e.g., bandwidth limitations of the agents) ($N_{A_X}$). For example, if a particular agent has a limited amount of bandwidth available, it may not be a viable candidate to serve as an anchor (especially if the location determination involves active communication between agents). In addition, if bandwidth in a swarm is scarce in general, more anchors may be selected for a cycle than in a different cycle such that on average, each anchor communicates with a lesser number of other robotic agents.

Anchor selection engine 152 may also take into account any other suitable parameters ($O_{A_X}$).

In particular embodiments, one or more of these parameters may be analyzed by one or more robotic agents 102 to determine how many agents and/or the particular agents that are suitable to serve as anchors for the next cycle. In a particular embodiment, each robotic agent of the swarm (or a subset thereof) analyzes the parameters to determine agents suitable to serve as anchors for the next cycle. In another embodiment, the robotic agents that are serving as the anchors during a particular cycle determine agents suitable to serve as anchors for the next cycle.

Figure 7:
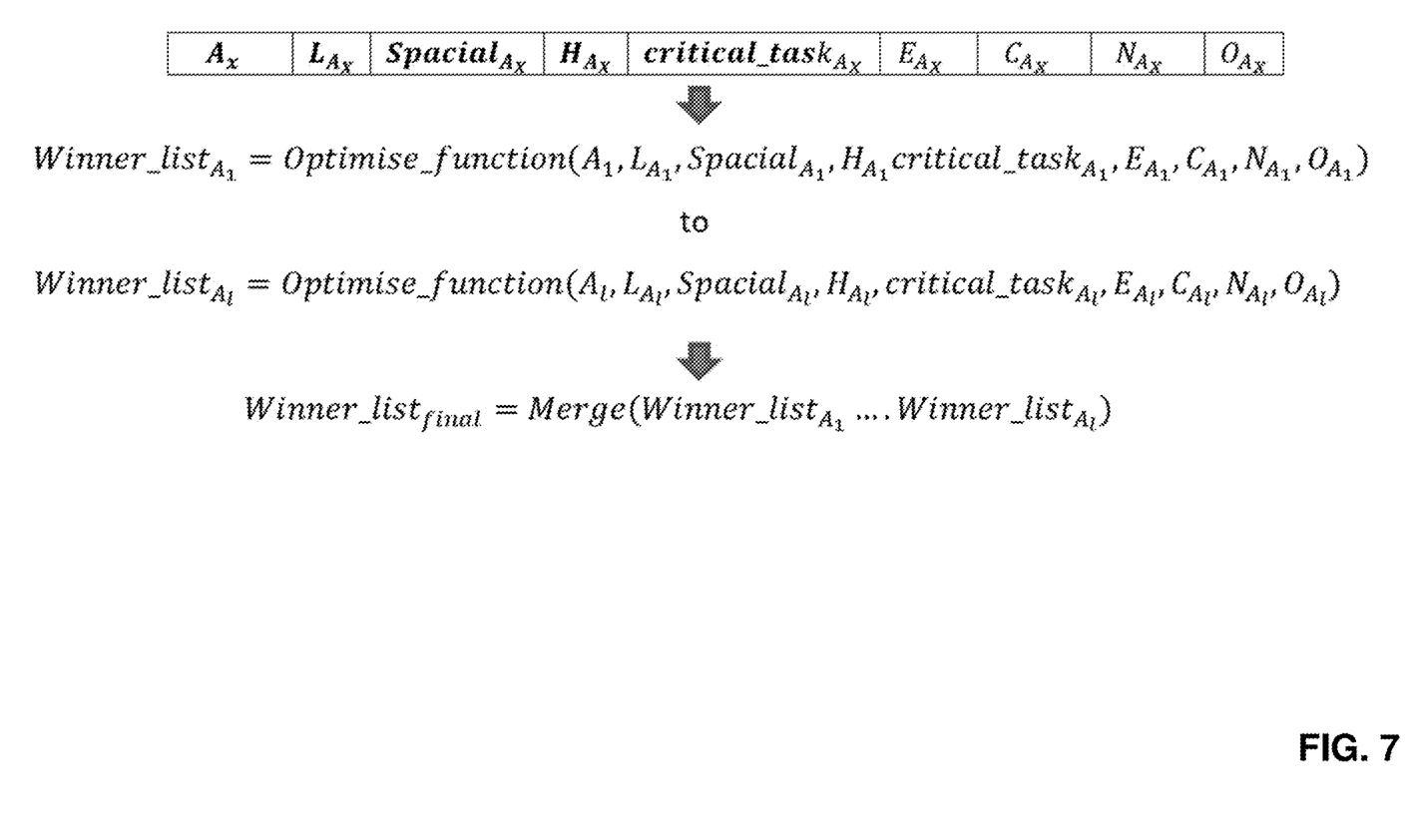
FIG. 7 depicts an anchor selection process in accordance with certain embodiments.

In various embodiments, the anchor selection process may take place as shown in FIG. 7 (or may use a subset of the information displayed herein).

According to the above, each robotic agent participating in the anchor selection process analyzes one or more of the parameter sets depicted and its respective anchor selection engine 152 uses an optimization function to generate a winner list comprising a list of agents best suited to serve as anchors during the next cycle. Any suitable optimization algorithm can be used to generate the consolidated score (Winner_list$_{A_X}$) combining any one or more of the above-mentioned parameters. For example, a multi-objective optimization method, such as a Pareto method or scalarization method may be used. In some embodiments, the list of agents may be ranked within the Winner_list$_{A_X}$ and/or may include scores indicating the suitability of the listed agents for serving as anchors during the next cycle.

The lists generated by the various robotic agents may then be merged into Winner_list$_{final}$ to determine the anchors that will serve as anchors during the next cycle. The list may be merged in any suitable manner based on the respective votes from the agents participating in the selection process.

In various embodiments, the selection of anchors may be performed in accordance with one or more constraints. As an example, in particular embodiments, the number of agents selected must be equal to or greater than a minimum number (e.g., 4 agents in a 3D space) or equal to or below a maximum number of anchors. As another example, in some embodiments, an agent that has an available bandwidth below a certain threshold may not be selected as a dynamic anchor.

In other embodiments, a single robotic agent may perform the anchor selection after gathering the information used during the selection (as opposed to the distributed selection process depicted above).

Figure 4:
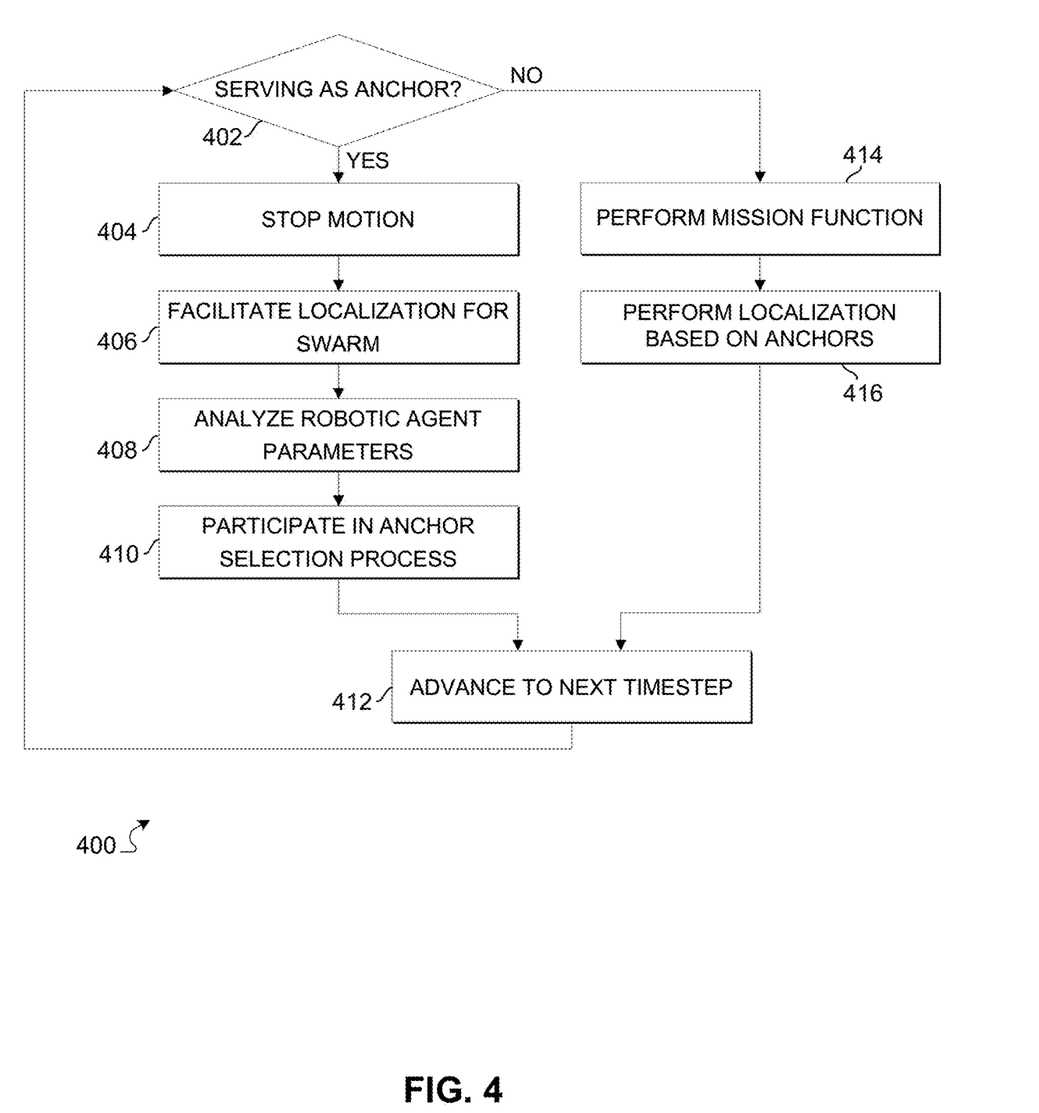
FIG. 4 depicts an example flow for dynamic anchor selection for swarm localization in accordance with certain embodiments.

FIG. 4 depicts an example flow 400 for dynamic anchor selection for swarm localization in accordance with certain embodiments. At 402, if a robotic agent is selected to serve as an anchor, it stops its motion at 404. It then facilitates localization for other agents of the swarm. For example, it may serve as a visual reference point if the other agent is calculating positioning based on visual odometry. As another example, the anchor agent may communicate time-stamped data to the other agents. As yet another example, the anchor agent may provide a beacon to the other agents. At 408, the anchor agent may analyze robotic agent parameters to be used in an anchor selection process (such as any of those listed above). In a particular embodiment, the anchor agent may collect these agent parameters from a subset of the other agents (e.g., the agents for which the anchor agent is facilitating position determination) or for all agents with which it is able to communicate. At 410, the anchor agent uses this information to participate in the selection of a new set of anchors. At 412, the anchor advances to the next timestep.

At 402, it is determined that the agent is no longer serving as an anchor. The agent may then perform a function of the mission at 414. The agent may also perform localization based on a set of anchor agents at 416. The flow may repeat any number of times. Operations may be added to the flow or omitted from the flow in various embodiments. Additionally, the operations may occur in any suitable order.

Figure 5:
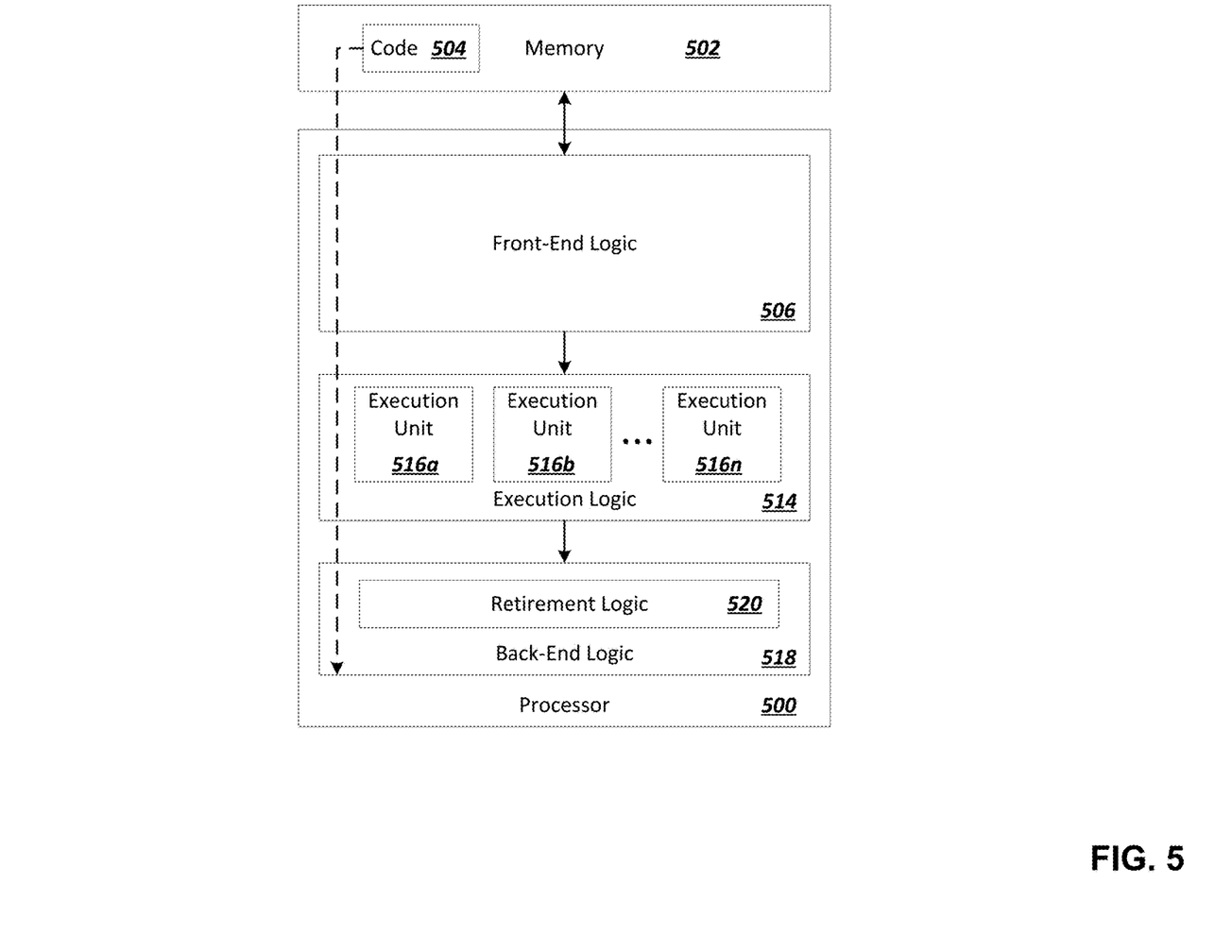
FIG. 5 depicts a processor in accordance with certain embodiments.
Figure 6:
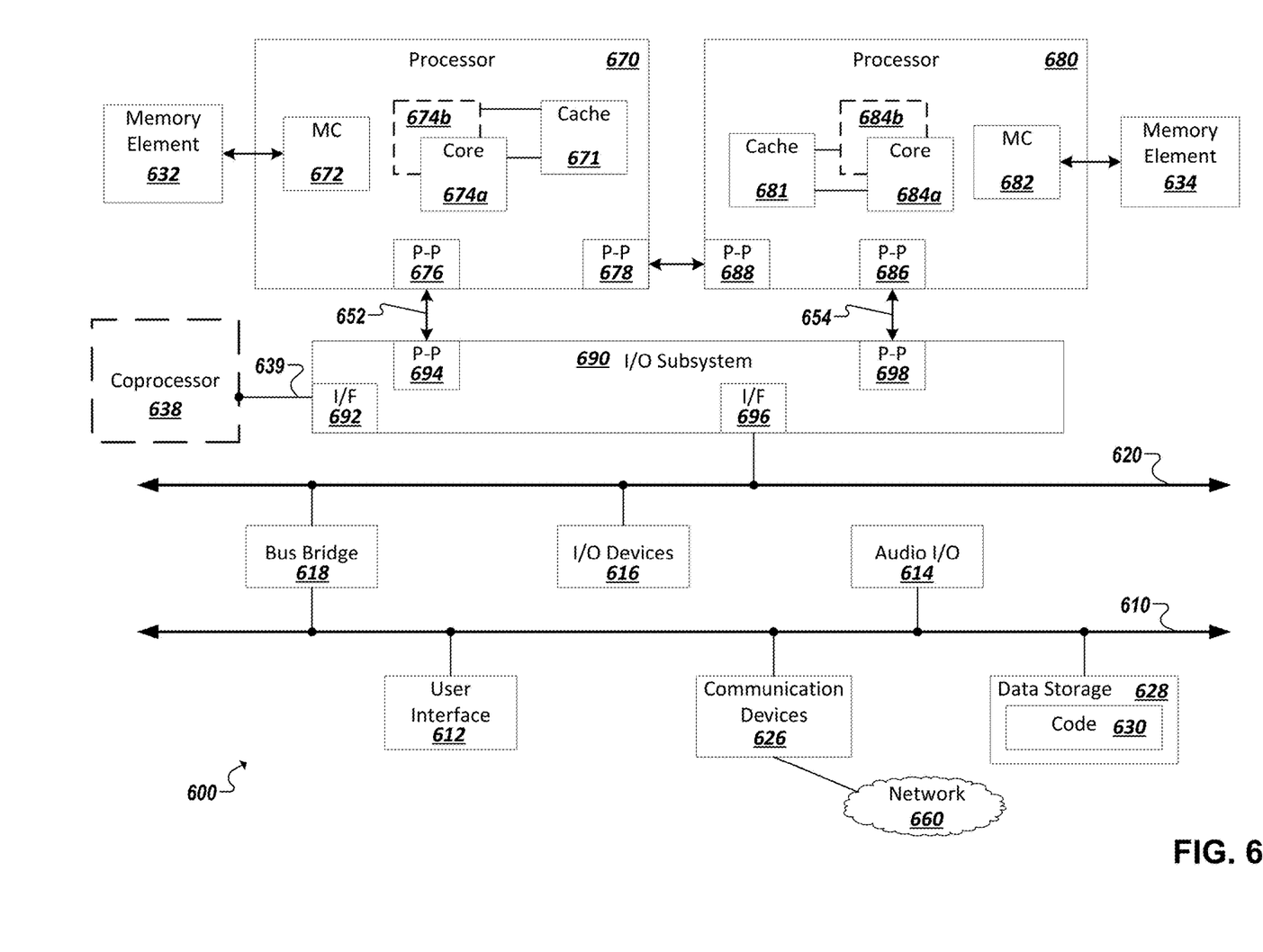
FIG. 6 depicts a computing system arranged in a point-to-point (PtP) configuration in accordance with certain embodiments.

FIG. 5 depicts a processor in accordance with certain embodiments and FIG. 6 depicts a computing system arranged in a point-to-point (PtP) configuration in accordance with certain embodiments. FIGS. 5-6 are block diagrams of exemplary computer architectures that may be used in accordance with embodiments disclosed herein (e.g., all or a portion of these architectures may be implemented by a robotic agent 102). Other computer architecture designs known in the art for processors and computing systems may also be used. Generally, suitable computer architectures for embodiments disclosed herein can include, but are not limited to, configurations illustrated in FIGS. 5-6.

FIG. 5 is an example illustration of a processor according to an embodiment. Processor 500 is an example of a type of hardware device that can be used in connection with the implementations above. Processor 500 may be any type of processor, such as a microprocessor, an embedded processor, a digital signal processor (DSP), a network processor, a multi-core processor, a single core processor, or other device to execute code. Although only one processor 500 is illustrated in FIG. 5, a processing element may alternatively include more than one of processor 500 illustrated in FIG. 5. Processor 500 may be a single-threaded core or, for at least one embodiment, the processor 500 may be multi-threaded in that it may include more than one hardware thread context (or "logical processor") per core.

FIG. 5 also illustrates a memory 502 coupled to processor 500 in accordance with an embodiment. Memory 502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 500 can execute any type of instructions associated with algorithms, processes, or operations detailed herein. Generally, processor 500 can transform an element or an article (e.g., data) from one state or thing to another state or thing.

Code 504, which may be one or more instructions to be executed by processor 500, may be stored in memory 502, or may be stored in software, hardware, firmware, or any suitable combination thereof, or in any other internal or external component, device, element, or object where appropriate and based on particular needs. In one example, processor 500 can follow a program sequence of instructions indicated by code 504. Each instruction enters a front-end logic 506 and is processed by one or more decoders 508. The decoder may generate, as its output, a micro operation such as a fixed width micro operation in a predefined format, or may generate other instructions, microinstructions, or control signals that reflect the original code instruction. Front-end logic 506 also includes register renaming logic 510 and scheduling logic 512, which generally allocate resources and queue the operation corresponding to the instruction for execution.

Processor 500 can also include execution logic 514 having a set of execution units 516*a*, 516*b*, 516*n*, etc. Some embodiments may include a number of execution units dedicated to specific functions or sets of functions. Other embodiments may include only one execution unit or one execution unit that can perform a particular function. Execution logic 514 performs the operations specified by code instructions.

After completion of execution of the operations specified by the code instructions, back-end logic 518 can retire the instructions of code 504. In one embodiment, processor 500 allows out of order execution but requires in order retirement of instructions. Retirement logic 520 may take a variety of known forms (e.g., re-order buffers or the like). In this manner, processor 500 is transformed during execution of code 504, at least in terms of the output generated by the decoder, hardware registers and tables utilized by register renaming logic 510, and any registers (not shown) modified by execution logic 514.

Although not shown in FIG. 5, a processing element may include other elements on a chip with processor 500. For example, a processing element may include memory control logic along with processor 500. The processing element may include I/O control logic and/or may include I/O control logic integrated with memory control logic. The processing element may also include one or more caches. In some embodiments, non-volatile memory (such as flash memory or fuses) may also be included on the chip with processor 500.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the computing systems described herein may be configured in the same or similar manner as computing system 500.

Processors 670 and 680 may also each include integrated memory controller logic (MC) 672 and 682 to communicate with memory elements 632 and 634. In alternative embodiments, memory controller logic 672 and 682 may be discrete logic separate from processors 670 and 680. Memory elements 632 and/or 634 may store various data to be used by processors 670 and 680 in achieving operations and functionality outlined herein.

Processors 670 and 680 may be any type of processor, such as those discussed in connection with other figures. Processors 670 and 680 may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a co-processor 638, such as a high-performance graphics circuit, machine learning accelerator, or other co-processor 638, via an interface 639, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a user interface 612 (such as a keyboard, mouse, touchscreen, or other input devices), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration capable of achieving the functionality and features of examples and implementations provided herein.

A module or engine as used herein may refer to circuitry and any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as any of the components or subcomponents of FIGS. 1, 5, and 6. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

In at least one embodiment, an apparatus comprises at least one sensor to collect localization information indicating a location of a first robotic agent of a plurality of robotic agents; and a processor comprising circuitry. The processor is to cause the first robotic agent to move and to utilize the at least one sensor and other robotic agents of the plurality of robotic agents to determine the location of the first robotic agent during a first period of time in which the first robotic agent is not selected as an anchor reference point; and cause the first robotic agent to remain stationary during a second period of time in which the first robotic agent is selected as an anchor reference point to assist other robotic agents of the plurality of robotic agents in location determination.

In an embodiment, the processor is to generate a localization confidence metric associated with the determined location of the first robotic agent, the localization confidence metric to be used in a determination of whether the first robotic agent is to serve as an anchor reference point during the second period of time. In an embodiment, the localization confidence metric is based at least in part on a metric indicative of quality of data collected by the at least one sensor. In an embodiment, the processor is to communicate the localization confidence metric to at least one other robotic agent of the plurality of robotic agents for use in the determination of whether the first robotic agent is to serve as an anchor reference point during the second period of time. In an embodiment, the processor is to participate in selection of a subset of the plurality of robotic agents to serve as anchor reference points during a third period of time. In an embodiment, the selection of the subset of the plurality of robotic agents is based at least in part on determined locations of the subset of the plurality of robotic agents relative to determined locations of other robotic agents of the plurality of robotic agents that are not part of the subset. In an embodiment, the selection of the subset of the plurality of robotic agents is based at least in part on a history indicating robotic agents that served as anchor reference points in prior time periods. In an embodiment, the selection of the subset of the plurality of robotic agents is based at least in part on indications of criticalities of tasks to be performed by the subset of the plurality of robotic agents. In an embodiment, the selection of the subset of the plurality of robotic agents is based at least in part on a type of sensor utilized by at least one robotic agent of the subset of the plurality of robotic agents. In an embodiment, the selection of the subset of the plurality of robotic agents is based at least in part on one or more measures of connectivity between at least one robotic agent of the subset of the plurality of robotic agents and other robotic agents of the plurality of robotic agents. In an embodiment, the selection of the subset of the plurality of robotic agents is based at least in part on communication bandwidth available to the subset of the plurality of robotic agents. In an embodiment, the selection of the subset of the plurality of robotic agents is based at least in part on information indicating the suitability of each robotic agent of the plurality of robotic agents to serve as an anchor reference point. In an embodiment, participation in selection of a subset of the plurality of robotic agents to serve as anchor reference points during a third period of time comprises generating a list of robotic agents of the plurality of robotic agents that are most suited to serve as anchor reference points during the third period of time and communicate the list to at least one other robotic agent of the plurality of robotic agents. In an embodiment, a determination of whether the first robotic agent is to serve as an anchor reference point during the second period of time is performed collectively by multiple robotic agents of the plurality of robotic agents. In an embodiment, the multiple robotic agents that collectively perform the determination are each to serve as an anchor reference point during the first period of time. In an embodiment, the processor is to receive a plurality of lists from other robotic agents of the plurality of robotic agents, each list indicating robotic agents that are most suited to serve as anchor reference points during the second period of time; and select a subset of the plurality of robotic agents to serve as anchor reference points during a third period of time based on the plurality of lists.

In at least one embodiment, a method comprises collecting, by at least one sensor, localization information indicating a location of a first robotic agent of a plurality of robotic agents; causing the first robotic agent to move and to utilize the at least one sensor and other robotic agents of the plurality of robotic agents to determine the location of the first robotic agent during a first period of time in which the first robotic agent is not selected as an anchor reference point; and causing the first robotic agent to remain stationary during a second period of time in which the first robotic agent is selected as an anchor reference point to assist other robotic agents of the plurality of robotic agents in location determination.

In an embodiment, a method further comprises generating a localization confidence metric associated with the determined location of the first robotic agent, the localization confidence metric to be used in a determination of whether the first robotic agent is to serve as an anchor reference point during the second period of time.

In at least one embodiment, at least one non-transitory machine readable storage medium has instructions stored thereon, the instructions when executed by a machine are to cause the machine to collect, by at least one sensor, localization information indicating a location of a first robotic agent of a plurality of robotic agents; cause the first robotic agent to move and to utilize the at least one sensor and other robotic agents of the plurality of robotic agents to determine the location of the first robotic agent during a first period of time in which the first robotic agent is not selected as an anchor reference point; and cause the first robotic agent to remain stationary during a second period of time in which the first robotic agent is selected as an anchor reference point to assist other robotic agents of the plurality of robotic agents in location determination.

In an embodiment, the instructions when executed by the machine are to cause the machine to generate a localization confidence metric associated with the determined location of the first robotic agent, the localization confidence metric to be used in a determination of whether the first robotic agent is to serve as an anchor reference point during the second period of time.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. An apparatus comprising:
    at least one sensor to collect localization information indicating a location of a first robotic agent of a plurality of robotic agents;
    first circuitry to:
        cause the first robotic agent to move and to utilize the at least one sensor and a first group of robotic agents of the plurality of robotic agents to determine the location of the first robotic agent during a first period of time in which the first robotic agent is not selected as an anchor reference point; and
        cause the first robotic agent to remain stationary during a second period of time in which the first robotic agent is selected as an anchor reference point to assist other robotic agents of the plurality of robotic agents in location determination;
    second circuitry to generate a localization confidence metric indicating a certainty of the determined location of the first robotic agent; and
    third circuitry to participate in selection of the first group of robotic agents to serve as anchor reference points during the first period of time, the participating comprising executing an optimization function taking into account localization confidence metrics of robotic agents and current locations of robotic agents with respect to a spatial distribution of the plurality of robotic agents to generate an indication of robotic agents suitable to serve as anchor reference points for the first period of time.

2. The apparatus of claim 1, the localization confidence metric indicating the certainty of the determined location to be used in a determination of whether the first robotic agent is to serve as an anchor reference point during the second period of time.

3. The apparatus of claim 2, wherein the localization confidence metric is based at least in part on a metric indicative of quality of data collected by the at least one sensor.

4. The apparatus of claim 2, further comprising fourth circuitry to communicate the localization confidence metric to at least one other robotic agent of the plurality of robotic agents for use in the determination of whether the first robotic agent is to serve as an anchor reference point during the second period of time.

5. The apparatus of claim 1, wherein the third circuitry is to participate in selection of a subset of the plurality of robotic agents to serve as anchor reference points during a third period of time.

6. The apparatus of claim 5, wherein the selection of the subset of the plurality of robotic agents is based at least in part on determined locations of the subset of the plurality of robotic agents relative to determined locations of other robotic agents of the plurality of robotic agents that are not part of the subset.

7. The apparatus of claim 5, wherein the selection of the subset of the plurality of robotic agents is based at least in part on a type of sensor utilized by at least one robotic agent of the subset of the plurality of robotic agents.

8. The apparatus of claim 5, wherein the selection of the subset of the plurality of robotic agents is based at least in part on one or more measures of connectivity between at least one robotic agent of the subset of the plurality of robotic agents and other robotic agents of the plurality of robotic agents.

9. The apparatus of claim 5, wherein the selection of the subset of the plurality of robotic agents is based at least in part on communication bandwidth available to the subset of the plurality of robotic agents.

10. The apparatus of claim 5, wherein the selection of the subset of the plurality of robotic agents is based at least in part on information indicating the suitability of each robotic agent of the plurality of robotic agents to serve as an anchor reference point.

11. The apparatus of claim 5, wherein participation in selection of a subset of the plurality of robotic agents to serve as anchor reference points during a third period of time comprises generating a list of robotic agents of the plurality of robotic agents that are most suited to serve as anchor reference points during the third period of time and communicate the list to at least one other robotic agent of the plurality of robotic agents.

12. The apparatus of claim 1, wherein a determination of whether the first robotic agent is to serve as an anchor reference point during the second period of time is performed collectively by multiple robotic agents of the plurality of robotic agents.

13. The apparatus of claim 12, wherein the multiple robotic agents that collectively perform the determination are each to serve as an anchor reference point during the first period of time.

14. The apparatus of claim 1, wherein the third circuitry is to:
receive a plurality of lists from other robotic agents of the plurality of robotic agents, each list indicating robotic agents that are most suited to serve as anchor reference points during the second period of time; and
select a subset of the plurality of robotic agents to serve as anchor reference points during a third period of time based on the plurality of lists.

15. A method comprising:
collecting, by at least one sensor, localization information indicating a location of a first robotic agent of a plurality of robotic agents;
causing the first robotic agent to move and to utilize the at least one sensor and a first group of robotic agents of the plurality of robotic agents to determine the location of the first robotic agent during a first period of time in which the first robotic agent is not selected as an anchor reference point;
causing the first robotic agent to remain stationary during a second period of time in which the first robotic agent is selected as an anchor reference point to assist other robotic agents of the plurality of robotic agents in location determination;
generating a localization confidence metric indicating a certainty of the determined location of the first robotic agent; and
participating in selection of the first group of robotic agents to serve as anchor reference points during the first period of time, the participating comprising executing an optimization function taking into account localization confidence metrics of robotic agents and current locations of robotic agents with respect to a spatial distribution of the plurality of robotic agents to generate an indication of robotic agents suitable to serve as anchor reference points for the first period of time.

16. The method of claim 15, further comprising utilizing the localization confidence metric indicating the certainty of the determined location in a determination of whether the first robotic agent is to serve as an anchor reference point during the second period of time.

17. At least one non-transitory machine readable storage medium having instructions stored thereon, the instructions when executed by a machine to cause the machine to:
collect, by at least one sensor, localization information indicating a location of a first robotic agent of a plurality of robotic agents;
cause the first robotic agent to move and to utilize the at least one sensor and a first group of robotic agents of the plurality of robotic agents to determine the location of the first robotic agent during a first period of time in which the first robotic agent is not selected as an anchor reference point;
cause the first robotic agent to remain stationary during a second period of time in which the first robotic agent is selected as an anchor reference point to assist other robotic agents of the plurality of robotic agents in location determination;
generate a localization confidence metric indicating a certainty of the determined location of the first robotic agent; and
participate in selection of the first group of robotic agents to serve as anchor reference points during the first period of time, the participating comprising executing an optimization function taking into account localization confidence metrics of robotic agents and current locations of robotic agents with respect to a spatial distribution of the plurality of robotic agents to generate an indication of robotic agents suitable to serve as anchor reference points for the first period of time.

18. The at least one non-transitory machine readable storage medium of claim 17, the localization confidence metric indicating the certainty of the determined location to be used in a determination of whether the first robotic agent is to serve as an anchor reference point during the second period of time.

19. The apparatus of claim 1, wherein the optimization function further takes into account a history indicating which robotic agents served as anchor reference points in a plurality of prior time periods, wherein the optimization function favors robotic agents that have served less time periods as anchor reference points over robotic agents that have served more time periods as anchor reference points.

20. The apparatus of claim 1, wherein the optimization function further takes into account indications of criticalities of tasks being performed by robotic agents.

21. The apparatus of claim 1, participating in selection of the first group of robotic agents to serve as anchor reference points during the first period of time further comprises participating in selecting how many robotic agents are to serve as anchor reference points during the first period of time.

22. The apparatus of claim 1, wherein executing an optimization function taking into account localization confidence metrics of robotic agents and current locations of robotic agents with respect to a spatial distribution of the plurality of robotic agents to generate an indication of robotic agents suitable to serve as anchor reference points for the first period of time further comprises ranking robotic agents in order of their suitability to serve as anchor reference points for the first period of time.

* * * * *